United States Patent [19]

Cooke

[11] Patent Number: 4,498,691
[45] Date of Patent: Feb. 12, 1985

[54] HOSE FITTING AND METHOD OF ASSEMBLY

[75] Inventor: Horise M. Cooke, Weatherford, Tex.

[73] Assignee: Stratoflex, Inc., Fort Worth, Tex.

[21] Appl. No.: 434,265

[22] Filed: Oct. 14, 1982

Related U.S. Application Data

[63] Continuation-in-part of Ser. No. 295,792, Aug. 24, 1981, abandoned, which is a continuation of Ser. No. 122,840, Feb. 20, 1980, abandoned.

[51] Int. Cl.³ .............................................. F16L 25/00
[52] U.S. Cl. ...................................... 285/12; 285/256; 29/508; 29/516
[58] Field of Search ............... 285/242, 243, 249, 255, 285/256, 259, 12, 177, 256, 259, 149; 29/508, 516

[56] References Cited

U.S. PATENT DOCUMENTS

| | | |
|---|---|---|
| Re. 20,629 | 1/1938 | Eiseman . |
| 2,273,398 | 2/1942 | Couty et al. .................. 285/259 X |
| 2,314,000 | 3/1943 | Lu Shen et al. ............... 285/259 X |
| 2,460,653 | 2/1949 | Raybould . |
| 2,797,111 | 6/1957 | Beazley ......................... 285/256 X |
| 2,857,176 | 10/1958 | McTaggart et al. ........... 285/177 X |
| 2,865,094 | 12/1958 | Press . |
| 3,191,975 | 6/1965 | La Marre et al. .................. 285/243 |
| 3,224,794 | 12/1965 | Crissy ........................... 285/256 X |
| 3,589,752 | 6/1971 | Spencer . |
| 4,111,469 | 9/1978 | Kavick ........................... 285/259 X |
| 4,319,774 | 3/1982 | Kavick . |

FOREIGN PATENT DOCUMENTS

| | | | |
|---|---|---|---|
| 115489 | 7/1942 | Australia ........................... 285/256 |
| 1231365 | 9/1960 | France . | |
| 1495499 | 8/1967 | France ............................. 285/256 |
| 334935 | 9/1930 | United Kingdom ............. 285/243 |
| 667181 | 2/1952 | United Kingdom . | |
| 770050 | 3/1957 | United Kingdom . | |
| 863523 | 3/1961 | United Kingdom ............ 285/24 L |
| 992378 | 5/1965 | United Kingdom ............ 285/256 |

Primary Examiner—Dave W. Arola
Attorney, Agent, or Firm—Marshall, O'Toole, Gerstein, Murray & Bicknell

[57] ABSTRACT

This disclosure deals with a fitting and with a method of assembling such a fitting with a hose. The fitting includes a socket-nipple and a set of exchangeable inserts. The socket-nipple forms an annular space which receives an end section of a hose, and the insert is positioned within the annular space and around the end section of the hose. Each socket-nipple is manufactured for use with a particular hose size (the inner diameter of the hose) and is provided in combination with a set of inserts of different thicknesses and designs, the inserts being matched for use with different hose types and thicknesses. Prior to assembly of the hose and fitting, a fastener may be secured to the hose in the instance where the hose has a reinforcement. The fastener prevents the reinforcement from flaring and it forms part of the completed hose and fitting assembly.

31 Claims, 17 Drawing Figures

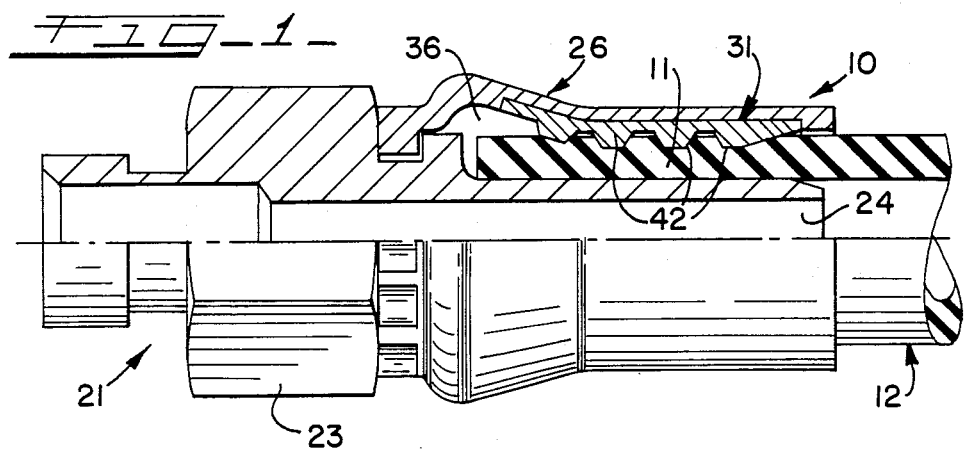
FIG-1-
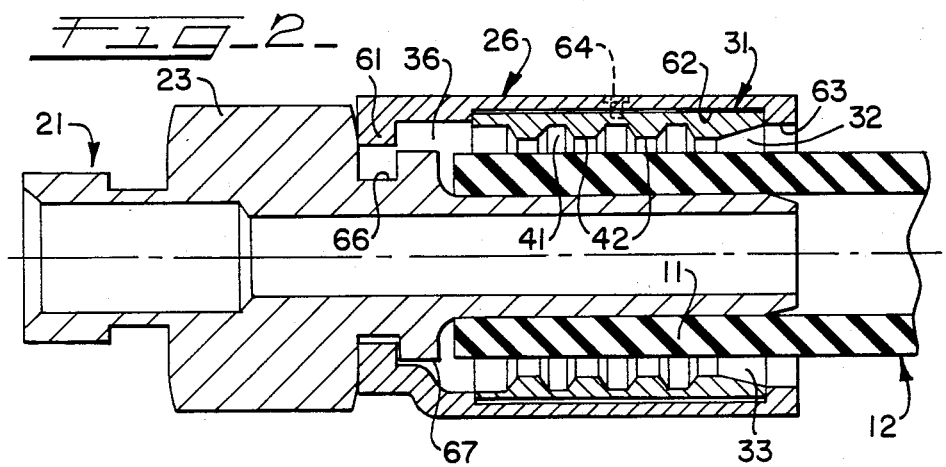
FIG-2-
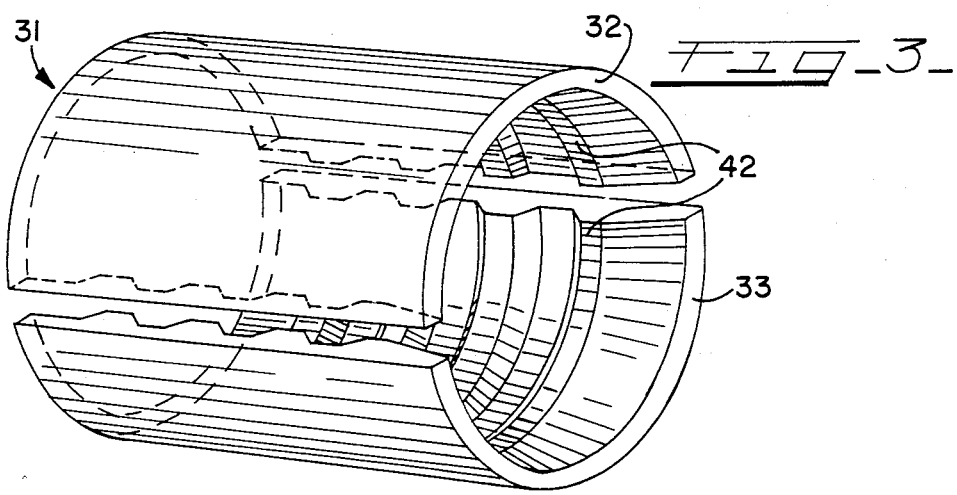
FIG-3-

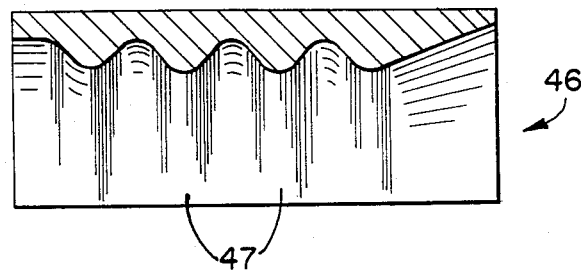
FIG-4-
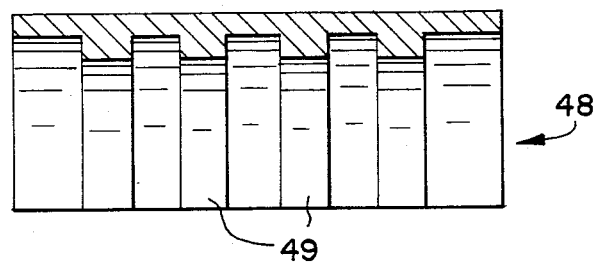
FIG-5-
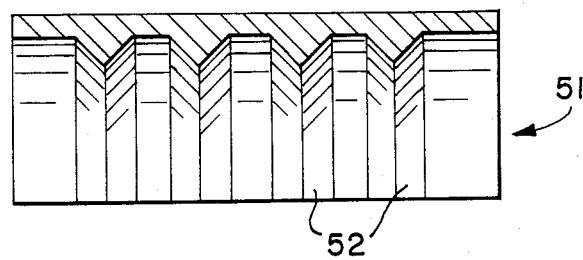
FIG-6-
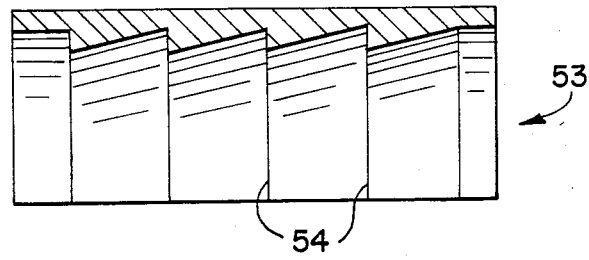
FIG-7-
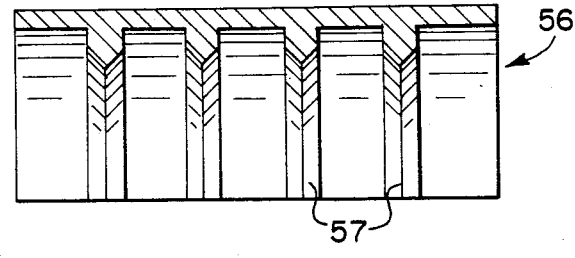
FIG-8-

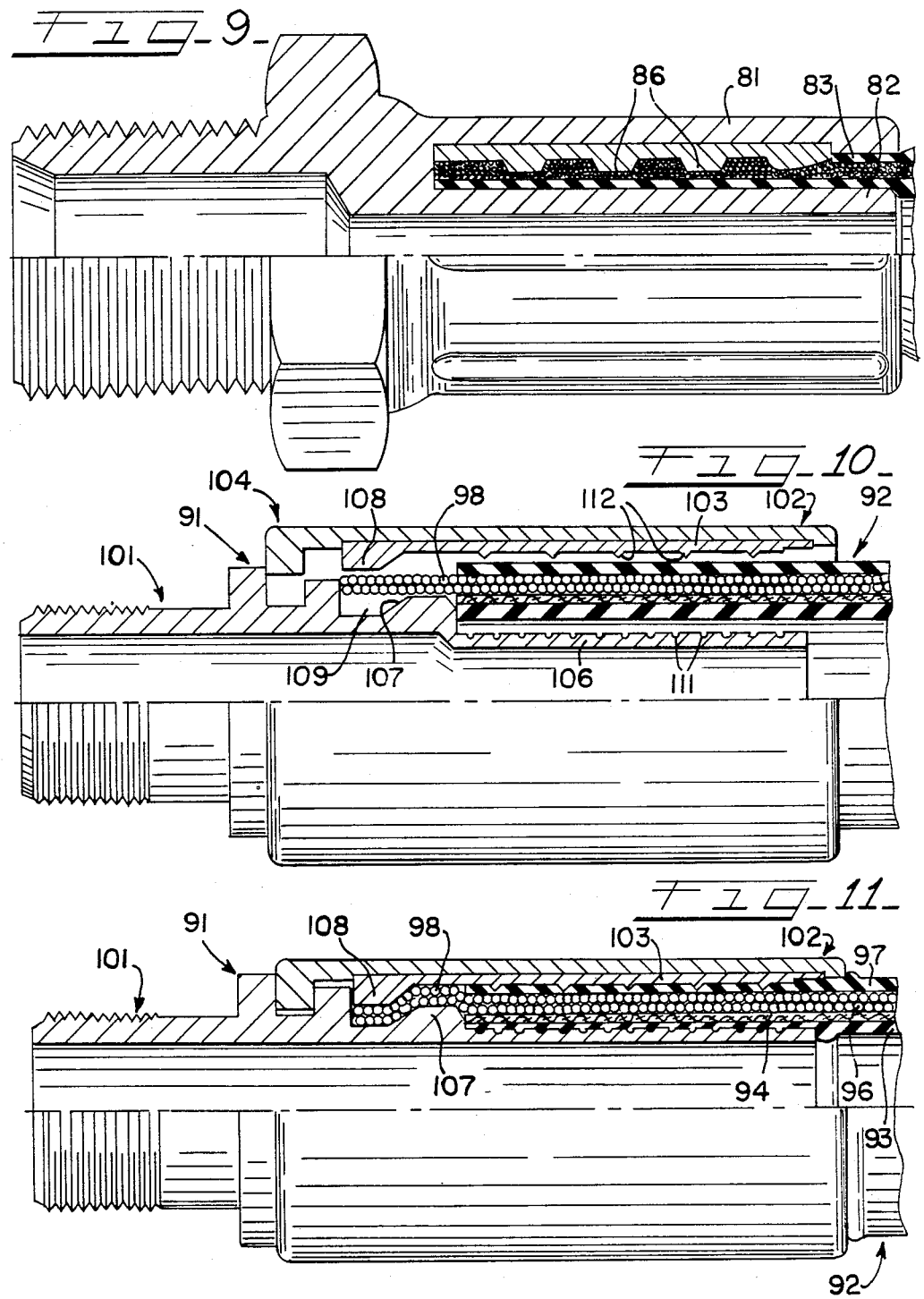

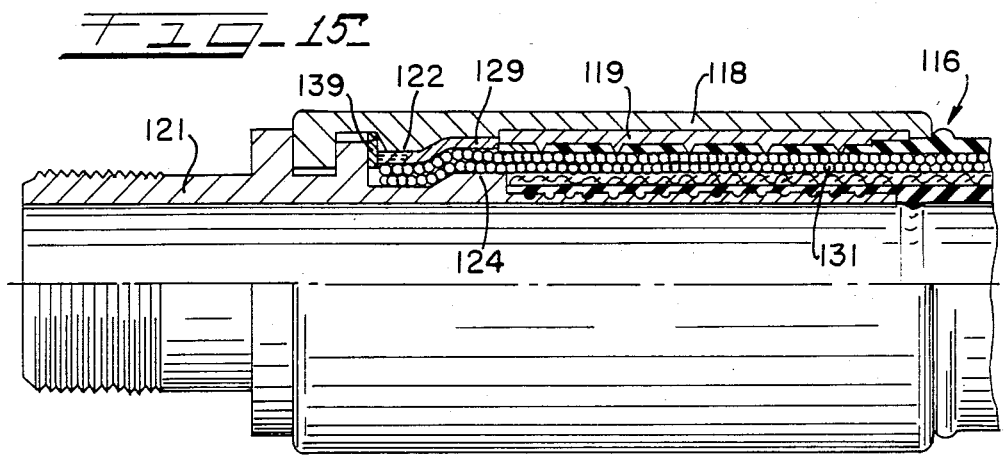
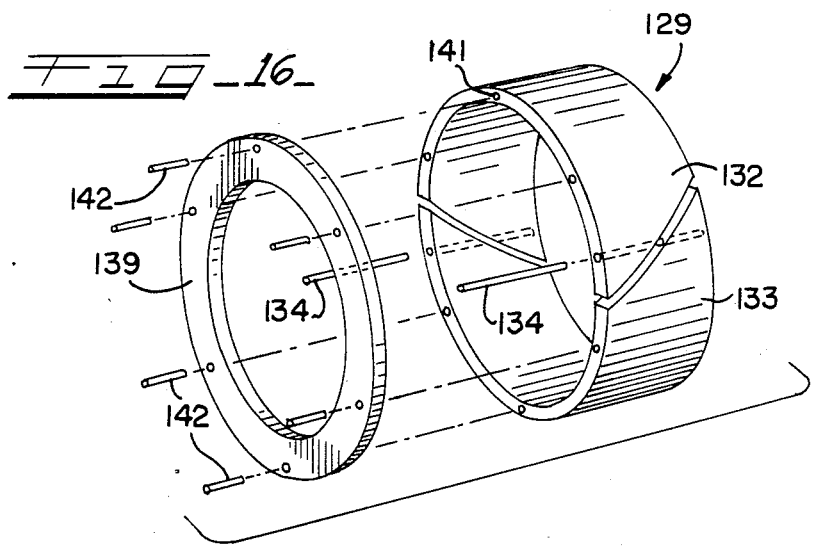
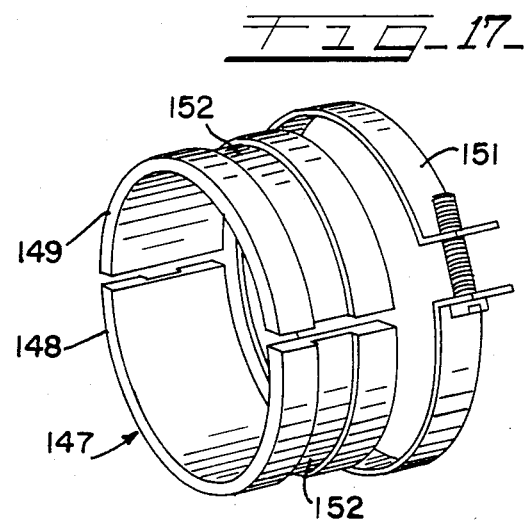

HOSE FITTING AND METHOD OF ASSEMBLY

This application is a Continuation-In-Part of application Ser. No. 295,792 filed Aug. 24, 1981, now abondoned, which is a Continuation of application Ser. No. 122,840 filed Feb. 20, 1980, now abondoned.

A well known construction of a hose and fitting assembly consists of a flexible reinforced hose and a metal fitting attached to an end of the hose. The hose usually includes a flexible inner tube surrounded by a reinforcement which may be a layer of wire or fabric, and sometimes an outer cover is provided around the reinforcement. The fitting includes a nipple that extends into the inner tube and a socket that extends around the reinforcement. The socket and the nipple compress the hose between them both to form a compression seal between the nipple and the tube, and to tightly attach the hose to the fitting.

In relatively low and medium pressure assemblies, the reinforcememt and the inner tube are compressed together to obtain a seal and an attachment. For high pressure applications and for hydraulic systems where pressure pulses are encountered, the end portion of the wire reinforcement is bared and tightly compressed between the socket and nipple to form a metal-to-metal connection. A compression seal is provided by pressing the inner tube against the nipple. The T. L. New U.S. Pat. Nos. 3,347,571 and 3,432,109 show examples of such assemblies; the latter patent also shows a "gland" seal which serves as a backup for the normal compression seal.

In the constructions referred to above, the amount of compression on the inner tube is usually critical. If the compression is too low, the compression seal will not be obtained, and in low and medium pressure assemblies the hose may blow off the fitting. On the other hand, if the compression is too high, the pressure on the inner tube will be excessive and it will crack, causing the assembly to leak.

Obtaining the desired degree of compression is particularly difficult in large size high pressure assemblies because they frequently have variations in thickness from one length to another and sometimes from one section to another of the same length. In the past, large diameter hose, such as the two and one-half inch inner diameter high pressure hose for use as rotary drilling hose, has frequently been "built up" and attached to fittings as they have been built, thereby avoiding any problems due to size variations. The fitting shown in the previously mentioned T. L. New U.S. Pat. No. 3,423,109 has also been used with specially constructed built-up hose. The principle problem arising from the use of such built-up hose is that the specially constructed hose ends produce the result that the hose is available only in specific hose lengths. In other words, the hose cannot be provided in long lengths which are cut to shorter sections as needed. In addition, if a section of such a hose is damaged, it has not been possible to cut off the damaged section and utilize the remaining hose at the same pressure levels.

It would, of course, be advantageous to use hose having "straight ends" (i.e. not built-up), but the previously mentioned variations in the hose wall thickness make such use difficult. It would be possible to accommodate such thickness variations by manufacturing a part of the fitting, such as the socket, in a variety of dimensions for each hose size, but this would be very expensive and would require a very large inventory. Similarly, where the fittings are swaged to attach them to the hose, the swage dies may be provided in a variety of sizes, but such dies are very expensive.

It is a general object of the present invention to provide improved apparatus and method of assembly, which avoids the foregoing problems.

It is another object of the invention to provide apparatus and method whereby fittings are attached to straight end hose, either braided, spiral wound or spiral cable wires, and the reinforcing wires at the cut ends of the hose are prevented from flaring.

Apparatus in accordance with the present invention comprises a fitting designed for attachment to an end section of a length of hose, the fitting including a socket-nipple and an insert. The socket-nipple includes a tubular nipple part adapted to be inserted into the end section of the hose, and a cylindrical socket part that fits over the end section of the hose and around the tubular nipple part, the socket and the nipple parts forming an annular space between them. Th insert is located between the socket part and the outside of the hose end section. The fitting is secured to the hose by reducing the width of the annular space in order to compress the end section of the hose between the insert and the nipple part.

The fitting is provided in combination with a group of exchangeable inserts, the designs differing in their configurations and wall thicknesses. Each insert is matched to a particular hose type and/or thickness. Consequently, a socket-nipple and a set of dies are usable with a variety of hose differing in design and wall thickness by selecting an appropriate insert from the group.

In one embodiment of the invention, the hose is attached to the fitting by compressing the reinforcement and the inner tube. In another embodiment, an end portion of a wire reinforcement is bared, and the inserts include means for bending and gripping the bared end. In still another embodiment, a clamp is attached to the hose to prevent flaring of the wire, and the clamp becomes the bending and gripping means of the fitting.

The foregoing and other objects and advantages of the present invention will become apparent from the following detailed description taken in conjunction with the accompanying figures of the drawings, wherein:

FIG. 1 is an elevational view of a completed hose and fitting assembly, partially in section, in accordance with the present invention;

FIG. 2 is a sectional view of the assembly prior to completion;

FIG. 3 is an enlarged perspective view of an insert of the fitting;

FIGS. 4 to 8 are sectional views illustrating alternative insert configurations;

FIG. 9 is a view similar to FIG. 1 but showing an alternative completed hose and fitting assembly;

FIG. 10 is a view similar to FIG. 2 but showing another alternative embodiment of a hose and fitting prior to complete assembly;

FIG. 11 is a view of the embodiment of FIG. 10 after complete assembly;

FIG. 12 is a view partially in section of the hose of FIG. 13 is a step of preparation for assembly;

FIG. 15 is a view of the hose and fitting of FIG. 12 after complete assembly;

FIG. 16 is a perspective view of a clamp of the assembly shown in FIGS. 12 to 15; and FIG. 17 is a perspective view of an alternative form of clamp.

DETAILED DESCRIPTION

Figure 13:
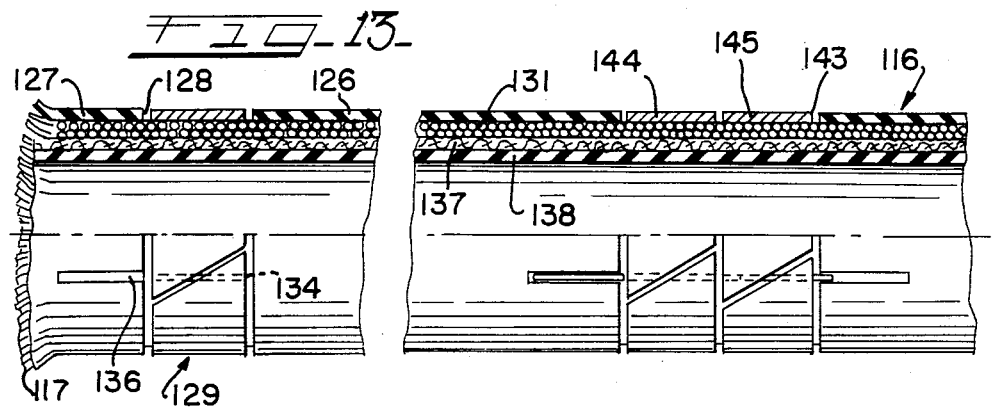

In the constructions disclosed herein, a fitting is secured to a hose by deforming it to reduce the diameter of the socket and an insert of the fitting. While the term "swaging" is frequently used herein to describe the process employed to deform the fitting, it should be understood that other processes, such as crimping, could also be used for this purpose, and that the term swaging is intended to include such other processes.

In the constructions shown in FIGS. 1 through 9, the portion of the fitting that compresses the hose to produce a compression seal is also the portion that secures or attaches the fitting to the hose.

With reference first to FIGS. 1 through 3, the reference numeral 10 indicates a socket-nipple which is secured to the end section 11 of a length of hose 12. The hose 12 in this specific example of the invention includes a tube of resilient material, such as plastic, rubber, synthetic rubber or the like, and the tube may or may not have one or more layers of reinforcement (not shown) embedded within or on the outside of the tube.

The socket-nipple 10 includes a coupling part 21 which is designed to be connected with another coupling part (not shown). It further includes a hexagonal wrench engageable part 23 which may be used to hold the fitting while attaching the fitting to the other coupling part. The socket-nipple 10 further includes a tubular nipple part 24 which is sized to be snugly inserted into the end section 11 of the hose 12, and a cylindrical outer socket part 26 which is sized to fit around the outside of the end section 11 of the hose 12.

In the specific example illustrated in FIGS. 1 to 3, the socket-nipple 10 has a two-piece construction wherein the tubular nipple part 24, the hexagonal part 23 and the coupling part 21 are in one piece and the socket part 26 is in a separate piece. The socket part 26 and the nipple part 24 are, prior to complete assembly, spaced apart and form an annular opening 36 which is closed, following complete assembly, at the rearward end (the left end as seen in FIGS. 1 and 2), the opening 36 being wide enough (before assembly) to receive the end section 11 of the hose and an insert 31 (FIGS. 1 to 3) formed from one or more parts. In the present example, the insert 31 comprises two identical semi-cylindrical halves 32 and 33. As best shown in FIG. 2, the two halves 32 and 33 extend around the end section 11 of the hose 12 and are between the hose and the socket part 26. Th length of the insert 31 is substantially the same as the length of the end section 11 of the hose but less than the axial length of the opening 36.

The two halves 32 and 33 of the insert 31 have a plurality of annular hose engaging teeth 42 formed on their inner peripheries, and shallow grooves 41 are formed between the axially-spaced teeth 42. As shown in FIGS. 2 and 3, the teeth 42 of the two halves are aligned when assembled because the two halves are identical. In the example shown in FIGS. 1 to 3, the shape and the radial height of the teeth 42 are designed for use with an unreinforced hose.

Each insert is provided in two or more radial thickness sizes for use with hose of different wall thicknesses. The insert sizes differ in the thickness of the wall, that is, the radial dimension from the I.D. of the teeth to the O.D. of the insert. Normally the outer diameter of the inserts will be constant, however, for a given hose size. Of course, for a hose that is undersized (has a relatively thin radial width), a relatively thick insert should be used to obtain the proper compression, and a relatively thin insert should be used with a hose having a relatively wide radial width.

In addition, other insert configurations may be provided to match other types of hose, as illustrated in FIGS. 4 to 8. FIG. 4 illustrates an insert 46 having rounded teeth 47 designed for use with a fabric reinforced hose; FIG. 5 shows an insert 48 having square teeth 49 designed for use with a plastic hose such as nylon; FIG. 6 shows an insert 51 having sharp teeth 52 designed for use with an exposed wire reinforcement. FIG. 7 shows an insert 53 having buttress teeth 54 designed for use with an exposed fabric cover; and FIG. 8 shows an insert 56 having long sharp teeth 57 for use with a hose having a resilient cover over a wire reinforcement. Thus, for a given hose size, a plurality of different insert configurations may be provided, and each insert configuration would be provided in a range of different radial thicknesses.

Considering the method of assembly and the use of the specific example shown in FIGS. 1-3, for a hose of a given type and size, this size being the internal diameter of the hose 12, a nipple-socket 10 is chosen to match the hose size. When properly matched, the nipple part 24 snugly engages the inner surface of the hose 12 and the socket part 26 is spaced from the outer surface of the hose. As mentioned above, each nipple-socket is provided in combination with a group or set of exchangeable inserts of different configurations and sizes. From this group, the insert configuration appropriate for the hose type is selected. The radial width of the hose wall is then measured and an insert sized to match the wall width is selected to produce a desired degree of compression on the hose.

Prior to assembly with the hose, the socket part 26 is in the shape shown in the upper half of FIG. 2. The rearward end of the part 26 has a radially inwardly extending flange 61 and a straight walled recessed inner part 62 that is sized in length to recieve the insert 31. Before or after assembly of the socket part with the insert, another flange 63 is formed at the forward end of the socket part 26, and this may be accomplished as by a precrimping or machining operation. The two insert halves are positioned within the recess 62 rearwardly of the flange 63 and, in the larger size fittings, the inserts are preferably held in place in the recess as by a set screw 64 (FIG. 2) or a spot of glue.

In this specific arrangement, the nipple part 24 and the socket part 26 are secured together by a flange-in-groove arrangement, consisting of the socket part flange 61 and an annular groove 66 between the nipple part 24 and the next part 23. A flange 67 is formed by the groove 66, having a diameter that is slightly less than the inner diameter of the flange 61.

The hose and fitting are assembled as follows, but not necessarily in the succession given: The insert 31, the nipple part 24 and the socket part 26 are formed as by machining to the shape shown in the upper half of FIG. 2; the inserts are mounted within the recess 62 of the socket part 26; the socket part and the inserts are positioned over the nipple part 24 as shown in the upper half of FIG. 2; the flange 61 is deformed into the groove 66 as by a precrimping operation as shown in the lower half of FIG. 2; the hose 12 is inserted into the annular space 36, and the socket part 26 and the insert 31 are deformed radially inwardly as shown in FIG. 1, as by a swaging operation. The deforming dies selected for assembling the fitting are matched to the hose and fitting size to reduce the outer diameter of the socket part 26 to a given size, and only a single set of dies are required for each fitting size because the different thinknesses of the inserts are able to compensate for variations in the hose wall thickness. With the desired degree of compression on the hose, the hose is secured to the fitting and a compression seal is obtained between the hose and the insert, without damaging the hose.

FIG. 9 shows a generally similar fitting but different socket-nipple. The socket 81 and the nipple 82 are machined from a single piece of metal. The hose 83 includes a bared metal braid reinforcement that is engaged by the teeth 86 of the insert in order to obtain a more secure grip on the hose for higher pressure applications. The socket includes a radial flange similar to the flange 63, which prevents the insert from being pulled out of the socket during use.

FIGS. 10 and 11 illustrate a fitting 91 for use with a high pressure large diameter hose 92. Such a hose and fitting assembly may be used, for example, as rotary drilling hose and as large bore (such as 2-½ inches) hydraulic hose which is subjected to pressure impulses. The hose 92 comprises a resilient innertube 93, layers of ducking 94, layers of wire reinforcement 96, and an outer cover 97. The wires 96 shown in FIGS. 10 and 11 are preferably spiral wound, although they may be braided. At the end of the hose, a portion of the layers 93, 94 and 97 are removed in order to bare an end section 98 of the wire reinforcement.

The fitting 91 comprises a nipple 101, an outer socket 102 an a multiple piece insert 103. The nipple and the socket are designed to be secured together by a flange in groove arrangement 104, and the fitting parts are secured together and to the hose 92 by swaging the socket 102 radially inwardly. The portion 106 of the nipple which extends into the hose interior, is constructed having a reduced diameter so that the nipple may be easily inserted into the hose 92. The portion 106 of the nipple 101 has a radially outwardly extending projection 107 which is adjacent but spaced from the rearward end of the annular opening between the socket and the nipple. The length of the bared section 98 of the wire is sized relative to the location of the projection 107 such that the section 98 extends over the projection 107 to the rearward end of the annular opening, and the layers 93, 94 and 97 terminate just forwardly of the projection 107.

The insert 103 is similar to the inserts previously described except that it further includes a radially inwardly extending projecting 108 at its rearward end. An annular reduced diameter space 109 is formed between the projection 107 and the rearward end of the annular space of the fitting, and the insert projection extends radially over the bared wire section 98 and the space 109.

To assemble the hose and fitting, the wire section 98 is bared as previously described and the nipple is inserted into the hose. The insert 103 and the socket 102 are assembled and positioned over the hose and the nipple. In their initial shapes, the socket and the nipple have a relatively wide annular space between them so that the hose may be relatively easily inserted into the annular. Due to the size of the hose and the amount of reinforcement, it would be difficult to make this initial assembly if it were necessary to deform the hose, but this problem is avoided by the reduced diameter part 106 of the nipple. The cut end of a braided or spiral wound wire reinforcement will flare somewhat when the layers 93, 94 and 97 are removed, but the flare is normally not enough to prevent assembly of the parts.

A conventional expanding mandrel (not shown) is then forced through the nipple 101 to expand the section 106 into tight engagement with the hose. As shown in FIG. 11, the finished inner diameter of the nipple is approximately equal to the inner diameter of the hose so that substantially "full flow" through the fitting is achieved.

The diameter of the socket 102 and the insert 103 is then reduced, preferably by a two-step swaging operation. The bared wire section 98 and the two projections 107 and 108 form a "gripping section" wherein a metal-to-metal-to-metal connection is formed. As shown in FIG. 11, the bared wire section 108 is both compressed and bent or folded between the two projections 107 and 108 in the gripping section, thereby forming a secure attachment between the hose and the fitting.

The portions of the nipple and the insert which are forwardly of the gripping section compress the hose and form a compression seal between the nipple and the inner tube 93. A plurality of annular grooves 111 on the nipple improve the seal. A plurality of teeth 112 are formed on the insert which bite into the outer cover 97 and also help to grip the hose. Since the proper compression is produced on the innertube, an efficient compression seal is produced and a back-up gland seal is not required.

As previously explained, prior to assembly of the insert 103 with the socket 102, the radial thickness of the hose is measured. A plurality of inserts 103 are provided in a range of radial thicknesses of the part of the insert which engages the cover layer 97, and an insert is chosen to produce the proper compression on the resilient or soft parts of the hose. Th radial thickness of the wire layer 96 is relatively uniform, and the heights and the spacing between the projections 107 and 108 is designed for each hose type and size.

FIGS. 12 to 16 illustrate and embodiment of the invention which is preferred for large bore, high pressure hose. While this embodiment may be used with braided and spiral wire hose, it is particularly advantageously used with cable wire reinforced hose, indicated by the numeral 116 in FIGS. 12-15. Such wire has a large flare at a cut end 117 (FIG. 13) and when the inner and outer layers of the hose are removed to bare an end section of the hose, similar to the bare section 98 of the hose 92, the flare is so great that the hose cannot be inserted into the fitting and assembled as described in connection with FIGS. 10 and 11.

Figure 12:
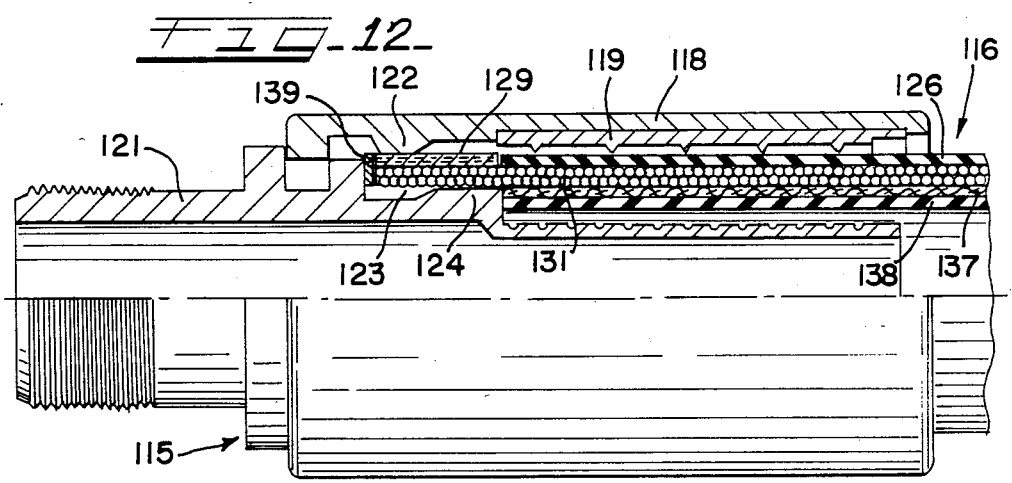
FIG. 12 is a view similar to FIGS. 2 and 10 but showing still another alternative embodiment of a hose and fitting prior to complete assembly.

With reference to FIG. 12, the fitting 115 includes a socket 118, an insert 119 and a nipple 121. The nipple 121 may be the same as the nipple 101. The insert 119 is the same as the insert 103 except that it does not extend rearwardly into the gripping section and over the bared end section of the hose 116, and, of course, the insert 119 does not therefore include an annular radial projection similar to the projection 108. An annular projection 122 is, however, formed on the inner periphery of the socket 118 and is located above the space 123 between the annular projection 124 of the nipple 121 and the rearward end of the annular fitting space.

Figure 14:
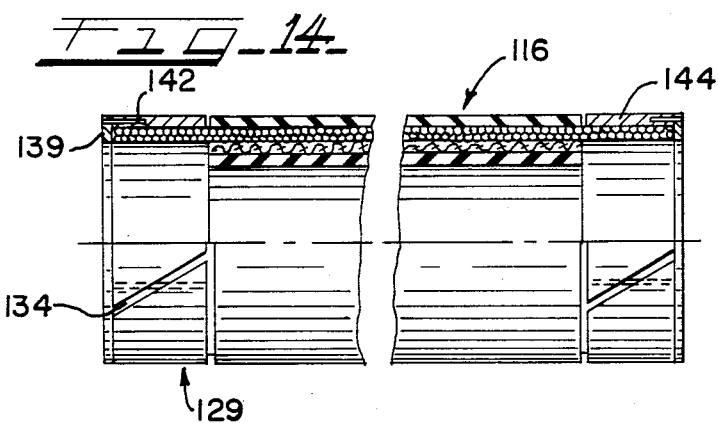
FIG. 14 is another view of the hose of FIG. 13 showing another step in the preparation.

FIGS. 13 and 14 illustrate the preparation of the hose 116 before assembly with the fitting 115. Prior to cutting a section 126 of the hose to a desired length, an annular piece of the outer cover 127 is removed to form an annular cutout or space 128. The cutout 128 is spaced a short distance from the end of the hose and is away from the flared end 117. A fastener 129, such as a clamp or band, is positioned in the cutout 128 and is tightly fastened around the outside of the wire reinforcing layer 131 of the hose.

As shown in FIG. 16, the fastener is a split band having two halves 132 and 133. The adjoining edges of the halves are angled and pins 134 are inserted into aligned holes in the edges in order to fasten the two halves together. FIG. 13 shows an axial slot 136 formed in the cover 126 which permits insertion of the pin. After the band is in place, the end portion of the hose is cut off closely adjacent the left side, as seen in FIGS. 13 and 14, of the band. The band, of course, retards outward flaring of the wires after cutting.

Cable wire tends to straighten out and flare when the inner layers 137 and 138 of the hose are removed, even though the fastener 129 is in place. To prevent such flaring, an annular flange 139 (FIGS. 12, 14, 15 and 16) is fastened to the halves 132 and 139 before the inner layers are removed, and the flange overlies the cut ends of the wires. Holes 141 are formed in the halves and the flange, and pins or screws 142 are placed in the holes to secure the flange to the halves. As shown in FIG. 14, the radial width of the flange is substantially equal to that of the wire layer and it prevents the wires from spreading out.

Similar fasteners and flanges are fastened to the hose where cuts are intended. Where a cut is to be made near the center of the hose 116, a wider cutout 143 may be formed in the outer cover and two adjacent fasteners 144 and 145 are placed on the hose, and the cut is made between the two fasteners.

With reference to FIGS. 12 and 15, the hose and fitting are assembled similarly to the assembly illustrated in FIGS. 10 and 11. The fastener has an axial length which is approximately equal to the length of the gripping section of the fitting, and the fastener extends between the projections 122 and 124. When the fitting is deformed as shown in FIG. 15, the halves 132 and 133 are bent along with the wire and the fastener becomes part of the assembly. Normally the flange 139 is broken loose from the halves 132 and 133 as the parts are deformed and the pins 142 bend or break. The projection 122 of the socket 118 should be made somewhat smaller than the projection 108 to accommodate the radial width of the fastener 129.

Various types of fasteners may be used. FIG. 17 illustrates an alternative fastener 147 including two semi circular halves 148 and 149 and a tightenable clamp 151. The two halves 148 and 149 preferably have grooves 152 in their outer peripheries which receive the clamp 151 when they are mounted on the hose, and the clamp 151 is then tightened to secure the halves.

The constructions shown in FIGS. 10 to 17 are therefore highly advantageous when used with high pressure hose such as rotary drilling hose and with large diameter hydraulic hose. The hose may be manufactured in long lengths and cut to shorter sections as needed in the field. This is a great advantage over prior art arrangements where hose is built up to specific lengths in a factory, which is a far more expensive and less convenient method. Constructions in accordance with this invention also enable parts of a damaged hose to be reused in high pressure appplications because special built-up hose ends are not necessary.

It will be apparent that a useful fitting construction has been provided. A socket-nipple for a particular size hose is provided in combination with a set of inserts, the inserts having a range of different radial thickness to accommodate different hose wall thicknesses. The inserts may also have different configurations for different types of braid, for example. Given a particular size, design and radial wall thickness of hose, and insert for that size, design and thickness is selected and positioned in the socket-nipple, and the parts are finally assembled. The insert is a relatively inexpensive item and therefore may be stocked in a wide variety of wall thicknesses and teeth designs, and since the insert parts are identical, only a single part has to be stocked for each variation. The insert may be in one, two, three or more parts, and they may be formed as by machining, casting, extrusion and bending, etc. The more expensive socket-nipple and the dies for deforming the parts need to be provided in only a limited variety, one socket-nipple and a set of dies for each size of hose. In addition to the advantages of reducing expensive inventories of parts and using the inserts to compensate for variations in wall thickness of hose and different designs of hose, the apparatus has the further advantage of prolonging the useful life of the hose and fitting assembly because the amount of compression of the hose can be better controlled. This control of the compression also produces better retention of the hose in the fitting and reduces the chance of leakage, and it avoids the need for a back-up gland seal and a special built-up hose end. As previously mentioned, the compression of the hose may be produced by various mechanisms for expanding the nipple and reducing the diameter of the socket and inserts. As shown in the drawings, the insert is relatively loosely received in the socket part during initial assembly so that the socket part and the insert may be readily assembled by hand.

I claim:

1. Apparatus for use in a hose and fitting assembly, the fitting and an end section of the hose being adapted to be secured together by permanently deforming parts of the fitting to compress the end section of the hose therebetween, said apparatus comprising a fitting comprising a socket-nipple including a tubular nipple part adapted to be inserted into the end section of the hose and a cylindrical socket part adapted to extend around the end section, said nipple and socket parts being spaced to form an annular opening which is adapted to receive the end section of the hose, a plurality of generally cylindrical inserts sized for insertion in said opening and between the end section and said socket part, and said inserts having different radial thicknesses which are inversely related to different radial thicknesses of hose sections, said socket part and a selected insert from said plurality of inserts being adapted to be permanently deformed radially inwardly and thereby to substantially uniformly compress the end section of the hose between said nipple part and said insert by reducing the width of said annular opening, said insert having hose gripping teeth formed on the inner periphery thereof, the radial thickness of said selected insert matching the radial thickness of the hose section to produce optimum compression on the hose end section.

2. Apparatus as in claim 1, wherein each of said inserts comprises a plurality of identical parts.

3. Apparatus as in claim 1, wherein the width of said annular opening is reduced by reducing the diameters of said socket part and said insert.

4. Apparatus according to claim 1, and further including means interconnecting said nipple part and said socket part, and means interconnecting said socket part and said insert for preventing axial movement of said insert out of said socket part.

5. Apparatus as in claim 1, wherein said hose has a resilient innertube and a layer of wire reinforcement around said innertube, a portion of said innertube at the end of said hose being removed to bare an end section of said reinforcement, the inner end of said opening forming a gripping section which is adapted to receive said bared end section of said reinforcement, said fitting including inner and outer annular radial projections on the radially inner and outer sides of said gripping section, and said bared end section being adapted to extend between said projections, said fitting being adapted to compress said innertube between said nipple portion and said insert and to compress said bared end section between said projections by reducing the width of said annular opening.

6. A fitting according to claim 5, wherein said insert extends into said gripping section and over said bared end section, and said outer annular projection is formed on said insert.

7. A fitting according to claim 6, wherein said outer annular projection is formed on said socket.

8. A fitting according to claim 7, and further including fastener means adapted to be secured to said hose around said bared end section prior to assembly of said hose and fitting.

9. A fitting according to claim 8, wherein said fastener means includes flange means extending radially across the end of said hose.

10. Apparatus according to claim 1, and further including an annular band 129 secured to an end portion of said hose.

11. The method of claim 10, wherein the width of said opening is reduced by reducing the outer diameter of said socket-nipple, the outer diameter being reduced to substantially the same size regardless of the hose type and insert design.

12. A hose and fitting assembly, said hose comprising a resilient innertube and a layer of wire reinforcement around said innertube, a portion of said innertube at the end of said hose being removed to bare an end section of said reinforcement, said fitting comprising a socket-nipple including a tubular nipple portion and a cylindrical socket adapted to extend around said nipple portion, said nipple portion and said socket part being spaced apart to form an annular opening which receives said hose, a generally cylindrical insert positioned in said opening between said hose and said socket part, the inner end of said opening forming a gripping section which receives said bared end section of said reinforcement, said fitting including inner and outer annular radial projections on the radially inner and outer sides of said gripping section, said bared end section extending between said projections, said fitting compressing said innertube between said nipple portion and said insert and compressing said bared end section between said projections by reducing the width of said annular opening, and fastener means secured to said hose around said bared end section prior to assembly of said hose and fitting.

13. The method of claim 12, wherein the width of said opening is reduced by reducing the outer diameter of said socket-nipple, the outer diameter being reduced to substantially the same size regardless of the hose type and insert design.

14. A hose and fitting assembly, said hose comprising a resilient innertube and a layer of wire reinforcement around said innertube, a portion of said innertube at the end of said hose being removed to bare an end section of said reinforcement, said fitting comprising a socket-nipple including a tubular nipple portion and a cylindrical socket adapted to extend around said nipple portion, said nipple portion and said socket part being spaced apart to form an annular opening which receives said hose, a generally cylindrical insert positioned in said opening between said hose and said socket part, the inner end of said opening forming a gripping section which receives said bared end section of said reinforcement, said fitting including inner and outer annular radial projections on the radially inner and outer sides of said gripping section, said bared end section extending between said projections, said fitting compressing said innertube between said nipple portion and said insert and compressing said bared end section between said projections by reducing the width of said annular opening, and fastener and means secured to said hose around said bared end section prior to assembly of said hose and fitting.

15. An assembly according to claim 14, wherein said fastener means includes flange means extending radially across the end of said hose.

16. A method of assembling a hose and fitting, the hose including a resilient innertube, a layer of wire reinforcement, and an outer cover, and the fitting including a nipple and a socket, comprising the steps of removing an annular portion of said outer cover to bare a section of the reinforcement, securing an annular fastener around said bared section, cutting said hose to form a hose length having the fastener closely adjacent the end thereof, positioning said nipple into said innertube of said hose length and positioning said socket around said hose length and said nipple, deforming said nipple and said socket into tight engagement with said innertube and said outer cover of said hose length and into metal-to-metal engagement with said bared section and said fastener.

17. The method according to claim 16, and further including the step of securing a flange to said fastener after said hose has been cut and before said nipple and socket have been deformed.

18. The method according to claim 16, and further including the steps of measuring the radial thickness of said hose, and positioning an insert between said socket and said outer cover, said insert having a selected radial thickness to produce a desired compression on said hose.

19. A hose and fitting assembly, said hose comprising a resilient innertube, a layer of wire reinforcement around said innertube and an outer cover, a portion of said innertube and said outer cover at the end of said hose being removed to bare an end section of said reinforcement, fastener means secured to said hose around said bared end section, said fitting comprising a socket-nipple including a tubular nipple portion and a cylindrical socket adapted to extend around said nipple portion, said nipple portion and said socket part being spaced apart to form an annular opening which receives said hose, the inner end of said opening forming a gripping section which receives said fastener means and said bared end section of said reinforcement, said fitting including inner and outer annular radial projections on the radially inner and outer sides of said gripping section, and said fastener means and said bared end section extending between said projections, said fitting compressing said innertube between said nipple portion and said fastener means and compressing said fastener means and said bared end section between said projections by reducing the width of said annular opening.

20. Apparatus according to claim 18, wherein said fastening means comprises shoulders formed on said socket 26 at the ends of said insert 31.

21. Apparatus according to claim 18, wherein said fastening means comprises at least one screw 64 connecting said socket 26 and said selected insert 31.

22. Apparatus according to claim 18, wherein said fastening means comprises an adhesive between said socket 26 and said selected insert 31.

23. Apparatus according to claim 18, wherein said socket 26 and said nipple 24 include means 61, 66 for securing said socket to said nipple.

24. Apparatus according to claim 18, wherein said hose end section 12 includes a wire reinforcement 98 and at least one tubular resilient wall 96, 97, a portion of the tubular resilient wall 96, 97 being removed at an end portion of the hose to thereby expose an end portion of the wire reinforcement, and gripping means 107, 108 on said nipple-insert for compressible bending and gripping said wire reinforcement.

25. Apparatus according to claim 24, wherein said gripping means comprises annular projections 107, 108 formed on said nipple and said insert.

26. Apparatus according to claim 18, and further including an annular band 129 secured to an end portion of said hose.

27. Apparatus according to claim 26, and further including an end flange 139 positioned adjacent the end of the hose and secured to said band.

28. A method of assembling a hose and a fitting by permanently deforming parts of the fitting using deforming dies into compressive relation with an end section of the hose, the end section having at least one flexible tubular wall and the diameter size of said tubular wall being related to the diameter of the deforming dies, comprising the steps of selecting a length of hose and the deforming dies associated with the size of the hose, providing a fitting assembly including a tubular nipple part, an outer sleeve-like socket part and a plurality of cylindrical inserts having different radial thicknesses, measuring the radial thickness of the wall of the hose and selecting one insert from said plurality of inserts, said selected insert having a radial thickness related to the measured thickness of the hose, placing said selected insert within said socket part, positioning said nipple part within the end section of the hose, positioning said selected insert and said socket part around said end section, and deforming said socket part and said insert in said dies to thereby compress said end section.

29. The method of claim 28, and further including the step of fastening said insert to said socket part before deforming said socket part and said insert.

30. The method of claim 29, wherein the hose includes a metal reinforcement, and further including the step of fastening a band to an end portion of the hose.

31. The method of claim 30, and further including the step of positioning an annular flange against the end of the hose, and fastening said flange to said band.

* * * * *